(12) United States Patent
Funk et al.

(10) Patent No.: US 10,914,615 B2
(45) Date of Patent: Feb. 9, 2021

(54) SCANNING RETICLE INCLUDING A GRATING FORMED IN A SUBSTRATE FOR AN OPTICAL POSITION MEASURING DEVICE

(71) Applicant: DR. JOHANNES HEIDENHAIN GmbH, Traunreut (DE)

(72) Inventors: Stefan Funk, Traunstein (DE); Andreas Hofmann, Rosenheim (DE); Peter Speckbacher, Kirchweidach (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 227 days.

(21) Appl. No.: 16/048,740

(22) Filed: Jul. 30, 2018

(65) Prior Publication Data
US 2019/0041243 A1 Feb. 7, 2019

(30) Foreign Application Priority Data
Aug. 2, 2017 (DE) .......... 10 2017 213 330

(51) Int. Cl.
| | | |
|---|---|---|
| *G01D 5/38* | (2006.01) | |
| *G01D 5/347* | (2006.01) | |
| *G02B 1/115* | (2015.01) | |
| *G02B 5/18* | (2006.01) | |

(52) U.S. Cl.
CPC ........... *G01D 5/38* (2013.01); *G01D 5/34715* (2013.01); *G02B 1/115* (2013.01); *G02B 5/1871* (2013.01)

(58) Field of Classification Search
CPC .. G01D 5/38; G01D 5/34715; G01D 5/34707; G01D 5/264; G01D 5/32; G01D 5/40; G02B 5/1871; G02B 1/115; G02B 5/1861; G02B 5/1814; G02B 1/11
See application file for complete search history.

(56) References Cited

U.S. PATENT DOCUMENTS

| | | | | |
|---|---|---|---|---|
| 7,573,581 | B2 * | 8/2009 | Holzapfel | G01D 5/38 250/237 G |
| 8,822,907 | B2 | 9/2014 | Joerger et al. | |
| 2003/0201241 | A1 * | 10/2003 | Harker | G02B 1/11 216/2 |
| 2006/0285113 | A1 * | 12/2006 | Sadjadi | G03F 9/7046 356/401 |
| 2009/0116035 | A1 * | 5/2009 | Shyu | G03F 7/70633 356/508 |

(Continued)

FOREIGN PATENT DOCUMENTS

| | | |
|---|---|---|
| DE | 102005020944 A1 | 12/2005 |
| EP | 2 450 673 B1 | 5/2012 |
| EP | 3 150 970 A1 | 4/2017 |

OTHER PUBLICATIONS

European Search Report issued in European Application No. 18170368, dated Nov. 6, 2018 (2 pages).

*Primary Examiner* — Jennifer D Bennett
(74) *Attorney, Agent, or Firm* — Carter Deluca & Farrell LLP

(57) ABSTRACT

A scanning reticle for an optical position measuring device includes a substrate having an upper surface, operating in transmission, and having different functional regions. The upper surface includes at least one region having a grating made up of gaps and ribs, the ribs being formed in the substrate. The upper surface includes an antireflection layer, which is discontinuous in the region of the gaps.

19 Claims, 2 Drawing Sheets

(56) References Cited

U.S. PATENT DOCUMENTS

| | | |
|---|---|---|
| 2009/0268295 A1 | 10/2009 | Miller |
| 2011/0039416 A1* | 2/2011 | Cole ................. H01L 21/31116 |
| | | 438/714 |
| 2015/0098090 A1* | 4/2015 | Holzapfel .......... G01B 9/02083 |
| | | 356/482 |
| 2016/0244581 A1* | 8/2016 | Brink ................... B05D 3/0453 |
| 2017/0090079 A1 | 3/2017 | Speckbacher et al. |

* cited by examiner

SCANNING RETICLE INCLUDING A GRATING FORMED IN A SUBSTRATE FOR AN OPTICAL POSITION MEASURING DEVICE

CROSS-REFERENCE TO RELATED APPLICATIONS

The present application claims priority to Application No. 10 2017 213 330.9, filed in the Federal Republic of Germany on Aug. 2, 2017, which is expressly incorporated in its entirety by reference thereto.

FIELD OF THE INVENTION

The present invention relates to a scanning reticle for an optical position measuring device, for example, in which a scanning head and a scale are moved relative to each other, and in which electrical signals corresponding to the position of the scanning head relative to the scale are generated in the scanning head. In addition to a light source and a detector, such scanning reticles are considered important, multifunctional components in the scanning head of a position measuring device.

BACKGROUND INFORMATION

European Patent No. 2 450 673 describes an optical position measuring device that is based on the scanning of a scale using light. The scale carries an optical grating, which is manufactured with high precision, is used as a positional reference, and is scanned by a scanning head. To this end, the light of a light source in the scanning head is guided through a scanning reticle onto a scale, from there, reflected back to the scanning head, and detected in one or more detectors. By analysis of the sensor signals, highly accurate positional values are ascertained, which indicate the displacement to be measured, between the scanning head and the scale. Gratings, which split the light up into different orders of diffraction or combine them again and superpose them, are positioned both on the scale and on the scanning reticle. Thus, the scanning reticle includes different functional areas on both its upper side and its lower side, the functional areas acting, for example, as a reflector, a diffraction grating, and a window for light beams. Coatings having antireflection layers are customary for functionless regions of the scanning reticle, in order to suppress disruptive light reflections, which could unintentionally reach a detector and, in so doing, invalidate the position measurement.

European Published Patent Application No. 3 150 970 describes a layer system for the side of a scanning reticle, which faces the light source, faces away from the scale, and also has mirrors and antireflection layers in addition to gratings.

SUMMARY

In contrast to the foregoing, example embodiments of the present application relate to refinement of the side of a scanning reticle facing the scale, the side including a deeply etched diffraction grating and window for light beams, as well as functionless regions.

Example embodiments of the present invention further improve scanning reticles for optical position measuring devices, by suppressing disruptive reflections even more effectively.

According to an example embodiment of the present invention, a scanning reticle for an optical position measuring device includes a substrate having an upper surface operated in transmission that has different functional regions. In this context, the upper surface includes at least one region having a grating made up of gaps and ribs, the gaps being formed in the substrate. The upper surface includes an antireflection layer, which is discontinuous in the region of the gaps.

The antireflection layer may include a layer, which is deposited on the transparent substrate, using thin-film technology, is only a few nanometers thick, and is made up of a material having a low absorption coefficient and a high effective index of refraction (e.g., at a wavelength of ca. 1 μm), such as silicon or germanium. Thus, in the production of the grating by an etching process, this thin layer does not create any additional process expenditure, since it is cut through during the etching of the substrate material for manufacturing the grating. Although, the antireflection layer is then only present on the ribs of the grating, but not in the gaps, disruptive back reflections are reduced markedly in the region of the grating.

The substrate may include a silicon oxide layer adjacent to the antireflection layer, the antireflection layer including a silicon layer arranged on the substrate, the silicon oxide layer arranged on the silicon layer.

The silicon layer may have a thickness between 2 nm and 8 nm and/or between 4 nm and 6 nm.

The silicon oxide layer may have a thickness between 225 nm and 250 nm and/or between an even multiple of between 225 nm and 250 nm.

A ratio of a width of the ribs to a period of the grating may be between 0.3 and 0.8.

A period of the grating may be greater than 3 μm and/or greater than or equal to 4 μm.

The gaps may be etched through the antireflection layer into the substrate.

According to an example embodiment of the present invention, an optical position measuring device includes the scanning reticle and a scanning head, from which light of a light source passes through the scanning reticle and strikes a scale, and then passes back through the scanning reticle into the scanning head. The scanning head includes detectors adapted to convert received light into electrical signals.

Further features and aspects of example embodiments of the present invention are described in more detail below with reference to the appended Figures.

DETAILED DESCRIPTION

Figure 1:
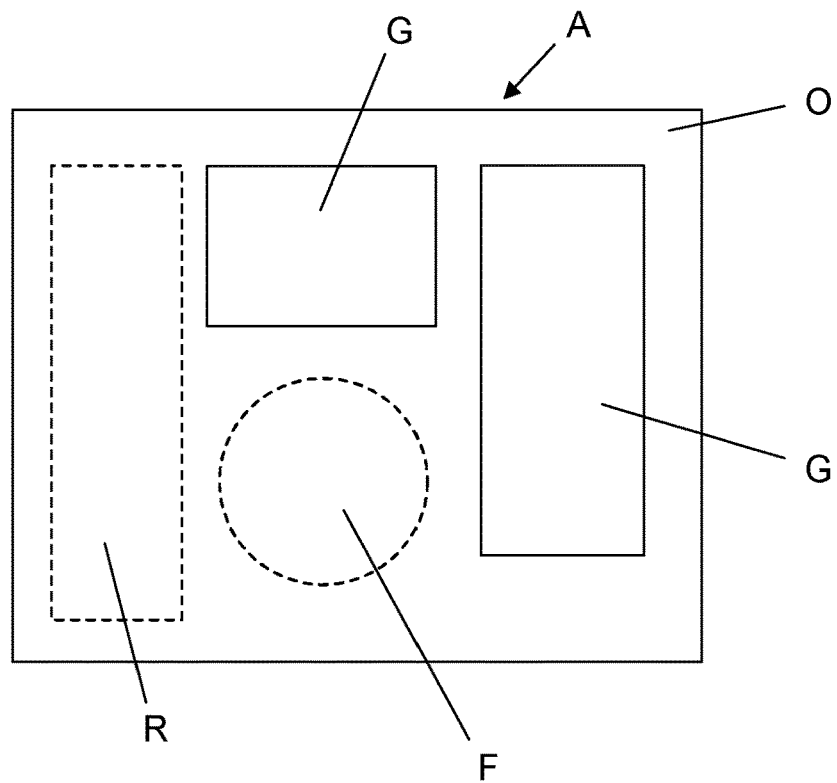
FIG. 1 is a top view of a scanning reticle according to an example embodiment of the present invention.

FIG. 1 is a top view of a scanning reticle A of an optical position measuring device. Different functional regions G, F, R are illustrated schematically. Among them are regions having gratings G, which split up the light into different orders of diffraction and/or combine different light beams reflected by a scale, in order to superpose them. Such gratings G may also be used for guiding and focusing the light inside of a position measuring device. Further below, the structure of grating G is discussed in detail.

One further functional region is window F, through which light beams are intended to pass as unhindered and as completely as possible. Such windows F do not necessarily have a special border. On the contrary, they are determined by the position of the light beams purposefully guided through this region. However, a border may help, for example, with the quality check of examining the windows for freedom from defects.

Reflecting regions R are regions, in which unwanted scattered light strikes and is possibly reflected by the upper surface O of scanning reticle A. These reflecting regions R are also not recognizable in some form as a pattern, but are defined by the impingement of scattered light. Thus, reflecting region R is represented by dashed lines in the same manner as window F.

Antireflection layers are customary in the area of reflecting regions R, in order to minimize disruptive reflections of scattered light. However, the deposition of such antireflection layers, which leave open the regions having gratings G or windows F, requires special process steps, such as an additional lithography step and an etching step, in order to remove the antireflection layer initially applied to the whole surface, in the region of gratings G and windows F.

Thus, it is proposed that the antireflection layer also be extended to the regions of gratings G and windows F, and that in so doing, an antireflection layer be used, which may be processed without a separate etching step. Consequently, unwanted reflections of the light may also be minimized in the region of gratings G and windows F, and in addition, the processing of such scanning reticles A is simplified.

Figure 2:
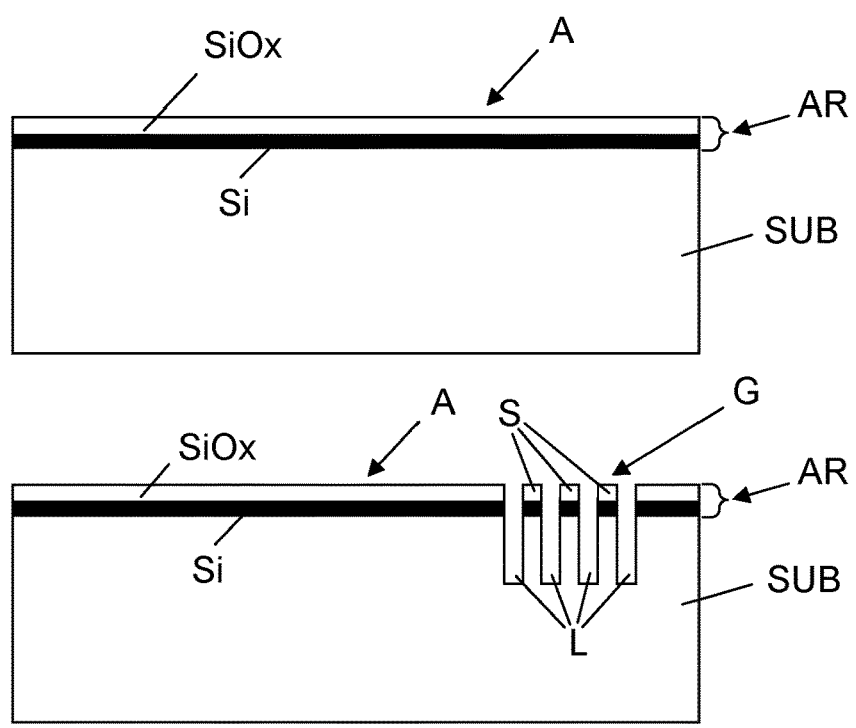
FIG. 2 is a side cross-sectional view of the scanning reticle, before and after the etching of the grating.

FIG. 2 illustrates how the foregoing is accomplished. The top portion of FIG. 2 illustrates a lateral section of scanning reticle A. A substrate SUB is illustrated, on which a thin layer Si of silicon is deposited. A further thin layer SiOx is deposited thereon. This further thin layer SiOx may be made of silicon oxide (empirical formula SiOx) and corresponds to the material of substrate SUB or behaves similarly to substrate SUB with regard to its optical properties and its ability to be etched. Substrate SUB may be, e.g., quartz glass or Borofloat glass.

It is also possible to deposit a silicon oxide layer on a glass ceramic carrier (as obtainable under the trade name ZERODUR), the thin layer Si and the further thin layer SiOx then being deposited on the silicon oxide layer as an antireflection layer AR. The layer or the layer stack, on which thin layer Si or antireflection layer AR is provided, is denoted by substrate SUB.

A different semiconductor, such as germanium, may also be used in place of silicon as thin layer Si. This thin layer Si is so thin, that it does not impede the transmission of the light through scanning reticle A considerably. A silicon layer Si having a thickness in the range of, for example, 2 nm to 8 nm, e.g., 4 nm to 6 nm, is well suited for this purpose, particularly for light of a wavelength of, for example, 1 µm and for a thickness of uppermost layer SiOx in the range of, for example, 225 nm to 250 nm. Even-numbered multiples of these range limits for the thickness are possible, as well. The reflection of such a layer construction is below 0.25% for orthogonally incident light.

A lithography step and a subsequent etching step are used for introducing grating G. The result is depicted at the bottom portion of FIG. 2. During the etching of the substrate material, uppermost layer SiOx is initially locally removed, and then the thin layer Si, as well, without, in so doing, interrupting the etching process or changing the etching chemistry. Thin layer Si is so thin, that such adaptation of the etching process is unnecessary. In the following, so much is removed from substrate SUB, that gaps L and ribs S form a phase grating, the ribs S having antireflection layer AR, the gaps L not having it. Gaps L are etched approximately, for example, 1 µm to 1.5 µm deep into substrate SUB. Antireflection layer AR is discontinuous in the area of gaps L. Thus, the reduction in back reflections achieved overall in the region of grating G is based on a reduction in back reflections on the faces of ribs S.

Figure 3:
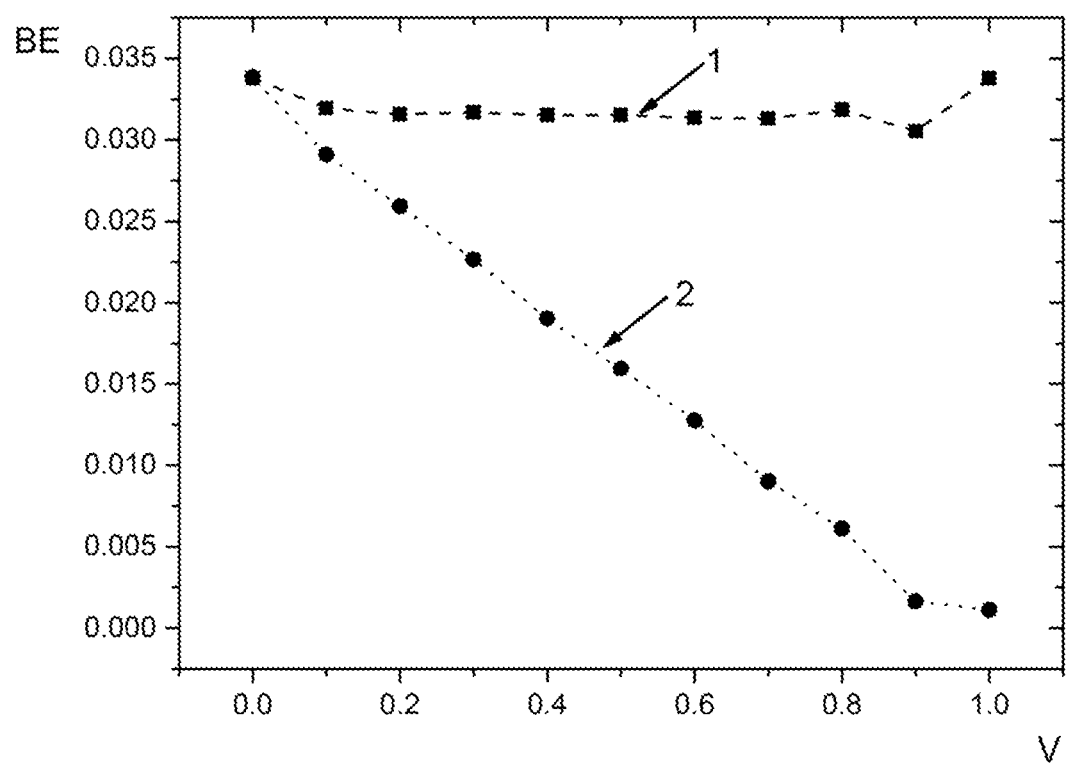
FIG. 3 illustrates the diffraction efficiency for the reflection of the grating, with and without antireflection layer.

The effectiveness of antireflection layer AR is illustrated in FIG. 3, as a function of ratio V of the width of ribs S to the period of grating G. Diffraction efficiency BE of the backscatter, that is, the ratio of the intensity of the reflected light summed up over all orders of diffraction, to the irradiated intensity, is depicted for a grating of period 10 µm.

Curve 1 illustrates this diffraction efficiency BE without antireflection layer AR, and curve 2 illustrates the diffraction efficiency BE with antireflection layer AR in the area of ribs S. It is apparent that the wider the ribs S are, i.e., the greater the ratio V is, the better the effectiveness of antireflection layer AR is. For customary values of V in the range of 0.5 (e.g., 0.3 to 0.8), a considerable reduction in diffraction efficiency BE can be obtained.

The illustrated behavior also does not change for lower grating periods down to, for example, 3 to 4 µm. However, below this, there are occasionally grating periods, at which the sum of the intensities of the backscattered orders of diffraction is even greater with antireflection layer AR than without antireflection layer AR, which means that grating periods greater than 3 µm, e.g., greater than or equal to 4 µm, should be selected. Alternatively, these critical ranges of the grating periods may be identified and avoided, for even smaller grating periods are possible. However, the maximum grating period for highly precise position measuring devices is, for example, 20 µm.

In addition, it may also checked if the 1st order diffraction efficiency particularly important for optical position measuring devices suffers in transmission through the antireflection layer AR on ribs S, for the highest possible diffraction efficiencies are desired in transmission, in order to receive a lot of measuring light at the detector, and thus, obtain an effective signal-to-noise ratio. Such a negative effect of antireflection layer AR on ribs S may be ruled out by suitable simulations and experiments. No effect on this diffraction efficiency is produced in a wide range of ratio V. This may be confirmed for a wide range of grating periods of, for example, 4 µm to 20 µm.

In summary, using an antireflection layer AR, the negative effect of disruptive reflections is able to be reduced markedly through an expanded range, and due to the particular refinement of antireflection layer AR in the region of grating G, even a simplification of the manufacturing process is able to be achieved.

What is claimed is:
1. A scanning reticle for an optical position measuring device, comprising:
   a silicon oxide substrate including an upper surface, operable in transmission, having different functional regions, at least one region having a grating including gaps and ribs, the gaps being formed in the substrate;
   wherein the upper surface includes an antireflection layer that is discontinuous in a region of the gaps; and
   wherein the antireflection layer includes a silicon layer arranged on the substrate and a silicon oxide layer arranged on the silicon layer.

2. The scanning reticle according to claim 1, wherein the antireflection layer includes a semiconductor layer having a thickness of a few nanometers.

3. The scanning reticle according to claim 1, wherein the silicon layer has a thickness between 2 nm and 8 nm.

4. The scanning reticle according to claim 3, wherein the silicon oxide layer has a thickness between 225 nm and 250 nm or between an even multiple of between 225 nm and 250 nm.

5. The scanning reticle according to claim 1, wherein a ratio of a width of the ribs to a period of the grating is between 0.3 and 0.8.

6. The scanning reticle according to claim 1, wherein a period of the grating is greater than 3 µm.

7. The scanning reticle according to claim 1, wherein the gaps are etched through the antireflection layer into the substrate.

8. The scanning reticle according to claim 1, wherein the optical position measuring device includes a scanning head, from which light of a light source passes through the scanning reticle and strikes a scale, and then, passes back through the scanning reticle into the scanning head, the scanning head including detectors adapted to convert received light into electrical signals.

9. The scanning reticle according to claim 1, wherein the silicon layer has a thickness between 4 nm and 6 nm.

10. The scanning reticle according to claim 1, wherein a period of the grating is greater than or equal to 4 µm.

11. An optical position measuring device, comprising:
a scanning reticle including a silicon oxide substrate having an upper surface, operable in transmission, that includes different functional regions, at least one region having a grating including gaps and ribs, the gaps being formed in the substrate, the upper surface including an antireflection layer that is discontinuous in a region of the gaps; and
a scanning head, from which light of a light source passes through the scanning reticle and strikes a scale, and then passes back through the scanning reticle into the scanning head, the scanning head including detectors adapted to convert received light into electrical signals;
wherein the antireflection layer includes a silicon layer arranged on the substrate and a silicon oxide layer arranged on the silicon layer.

12. The optical position measuring device according to claim 11, wherein the antireflection layer includes a semiconductor layer having a thickness of a few nanometers.

13. The optical position measuring device according to claim 11, wherein the silicon layer has a thickness between 2 nm and 8 nm.

14. The optical position measuring device according to claim 13, wherein the silicon oxide layer has a thickness between 225 nm and 250 nm or between an even multiple of between 225 nm and 250 nm.

15. The optical position measuring device according to claim 11, wherein a ratio of a width of the ribs to a period of the grating is between 0.3 and 0.8.

16. The optical position measuring device according to claim 11, wherein a period of the grating is greater than 3 µm.

17. The optical position measuring device according to claim 11, wherein the gaps are etched through the antireflection layer into the substrate.

18. The optical position measuring device according to claim 11, wherein the silicon layer has a thickness between 4 nm and 6 nm.

19. The optical position measuring device according to claim 11, wherein a period of the grating is greater than or equal to 4 µm.

* * * * *